US012682784B2

(12) United States Patent
Furneaux

(10) Patent No.: US 12,682,784 B2
(45) Date of Patent: Jul. 14, 2026

(54) TRAINING PLATFORM FOR TRAINING A USER ON AN APPLICATION

(71) Applicant: INTERNATIONAL BUSINESS MACHINES CORPORATION, Armonk, NY (US)

(72) Inventor: Iain Furneaux, Witley (GB)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 17/945,153

(22) Filed: Sep. 15, 2022

(65) Prior Publication Data

US 2024/0096233 A1      Mar. 21, 2024

(51) Int. Cl.
*G09B 19/00* (2006.01)
*G09B 5/02* (2006.01)

(52) U.S. Cl.
CPC ........... *G09B 19/0053* (2013.01); *G09B 5/02* (2013.01)

(58) Field of Classification Search
CPC .............................. G09B 5/02; G09B 19/0053
See application file for complete search history.

(56) References Cited

U.S. PATENT DOCUMENTS

| | | | |
|---|---|---|---|
| 11,263,913 B2 | 3/2022 | Harney | |
| 2016/0364996 A1 | 12/2016 | Gile | |
| 2020/0098275 A1* | 3/2020 | Doti | ...................... A63F 13/216 |
| 2020/0357296 A1 | 11/2020 | Sharma | |

* cited by examiner

*Primary Examiner* — Thomas J Hong
(74) *Attorney, Agent, or Firm* — Jordan T. Schiller

(57) ABSTRACT

The invention provides for a method, computer program product, and computer system for a training platform for training a user on an application. The method provides training content to a training platform interface at a user browser, wherein the training content includes instructions for a user on interaction with an application and provides access to an application instance at the training platform interface for user interaction with the application instance. The method further provides a session of an application instance hosted by an application node for the duration of a training session. The method may further determine a training content and an application from user input received at the user browser and broadcasting a message to find a free application instance of the application. The method may further select an application instance from one or more responses from application nodes based on defined selection factors.

16 Claims, 6 Drawing Sheets

200

PROVIDE TRAINING CONTENT TO A TRAINING PLATFORM INTERFACE OF A USER 201

PROVIDE ACCESS TO AN APPLICATION INSTANCE AT THE TRAINING PLATFORM INTERFACE 202

PROVIDE ONE OR MORE TRAINING INTERACTION FUNCTIONS FOR AUTOMATED INTERACTION WITH THE APPLICATION INSTANCE 203

DETERMINE A TRAINING CONTENT AND APPLICATION FROM A USER INPUT 204

SELECT AN APPLICATION INSTANCE AND PROVIDE A SESSION 205

RECEIVE A USER INPUT OF A SELECTED TRAINING INTERACTION FUNCTION 206

ACTIVATE AN AGENT AT THE APPLICATION HOST TO RUN A SCRIPT ON THE APPLICATION INSTANCE 207

HIDE THE TRAINING CONTENT DURING THE TRAINING INTERACTION FUNCTION 208

200

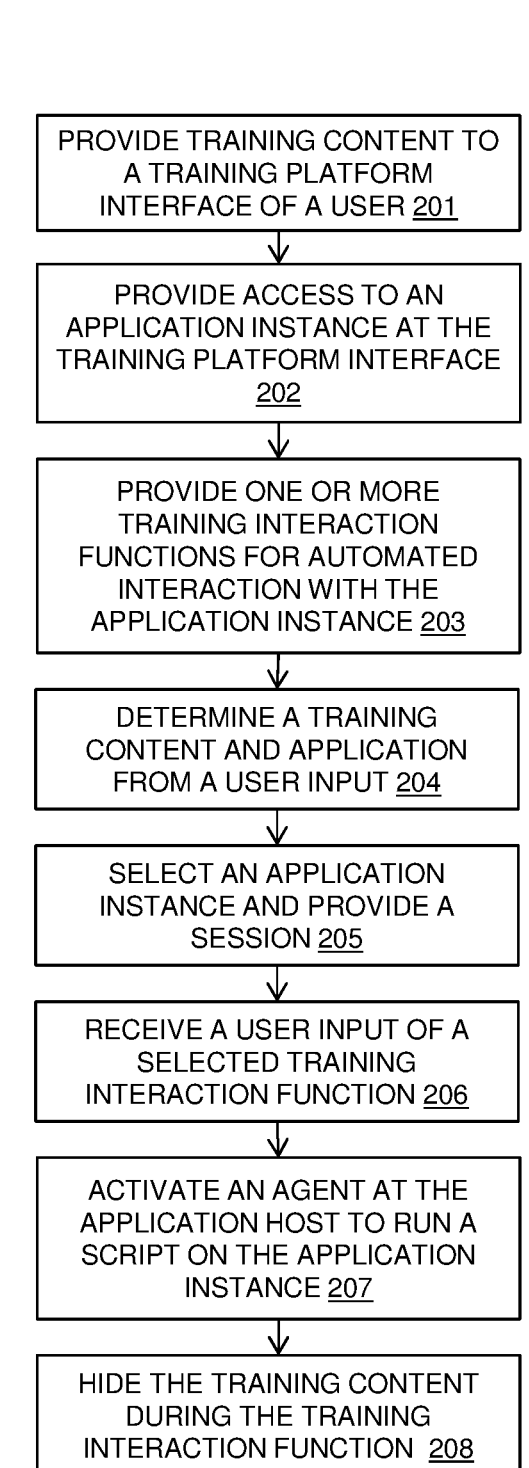

PROVIDE TRAINING CONTENT TO A TRAINING PLATFORM INTERFACE OF A USER 201

PROVIDE ACCESS TO AN APPLICATION INSTANCE AT THE TRAINING PLATFORM INTERFACE 202

PROVIDE ONE OR MORE TRAINING INTERACTION FUNCTIONS FOR AUTOMATED INTERACTION WITH THE APPLICATION INSTANCE 203

DETERMINE A TRAINING CONTENT AND APPLICATION FROM A USER INPUT 204

SELECT AN APPLICATION INSTANCE AND PROVIDE A SESSION 205

RECEIVE A USER INPUT OF A SELECTED TRAINING INTERACTION FUNCTION 206

ACTIVATE AN AGENT AT THE APPLICATION HOST TO RUN A SCRIPT ON THE APPLICATION INSTANCE 207

HIDE THE TRAINING CONTENT DURING THE TRAINING INTERACTION FUNCTION 208

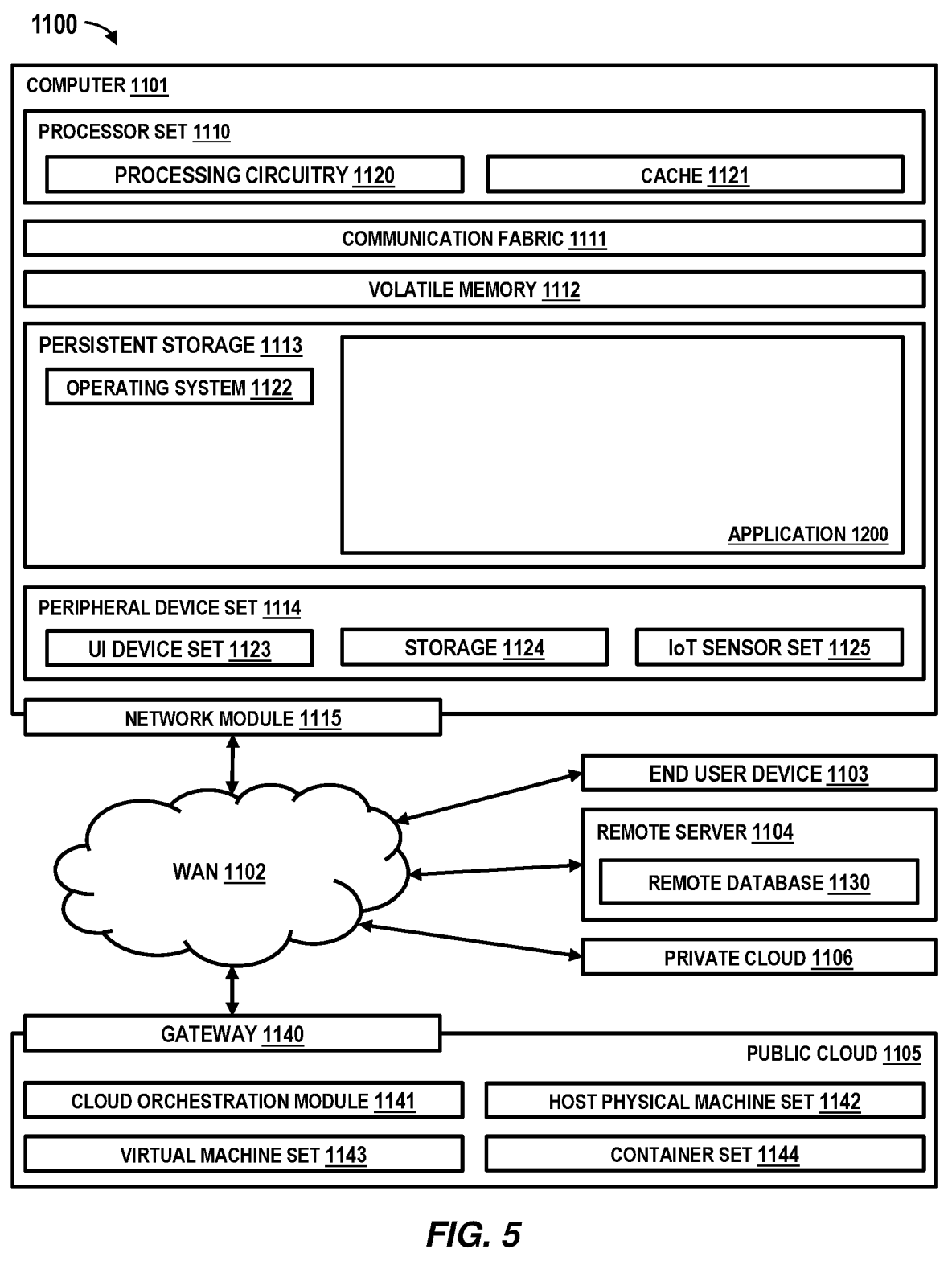

COMPUTER 1101

PROCESSOR SET 1110

| PROCESSING CIRCUITRY 1120 | CACHE 1121 |

COMMUNICATION FABRIC 1111

VOLATILE MEMORY 1112

PERSISTENT STORAGE 1113

OPERATING SYSTEM 1122

APPLICATION 1200

PERIPHERAL DEVICE SET 1114

| UI DEVICE SET 1123 | STORAGE 1124 | IoT SENSOR SET 1125 |

NETWORK MODULE 1115

WAN 1102

END USER DEVICE 1103

REMOTE SERVER 1104

REMOTE DATABASE 1130

PRIVATE CLOUD 1106

GATEWAY 1140

PUBLIC CLOUD 1105

| CLOUD ORCHESTRATION MODULE 1141 | HOST PHYSICAL MACHINE SET 1142 |
| VIRTUAL MACHINE SET 1143 | CONTAINER SET 1144 |

*FIG. 5*

TRAINING PLATFORM FOR TRAINING A USER ON AN APPLICATION

BACKGROUND

The present invention relates to training platforms, and more specifically, to a training platform for training a user on an application.

Existing training systems stand as a separate entity from the system they are educating a user on how to use. Some training systems have static links to the system being taught and some are integrated in a trivial way.

Current training on application is often carried out by running the application side by side with training content. Students usually source, install and maintain applications they wish to be trained on.

Furthermore, training tends to be decentralized with only the course materials centralized. Scaling is traditionally done by sending out multiple uncontrolled copies of the training material but application support is generally shared.

SUMMARY

According to an aspect of the present invention there is provided a computer-implemented method for providing a training platform for training a user on an application, said method carried out by one or more processors of a computer system and comprising: providing training content to a training platform interface at a user browser, wherein the training content includes instructions for a user on interaction with an application; and providing access to an application instance at the training platform interface for user interaction with the application instance.

According to another aspect of the present invention there is provided a system for providing a training platform for training a user on an application, comprising: a processor and a memory configured to provide computer program instructions to the processor to execute the function of the components: a training content component for providing training content from a training content server to a training platform interface at a user browser, wherein the training content includes instructions for a user on interaction with an application; and an application component for providing access to an application instance at the training platform interface for user interaction with the application instance.

According to a further aspect of the present invention there is provided a computer program product for providing a training platform for training a user on an application, the computer program product comprising a computer readable storage medium having program instructions embodied therewith, the program instructions executable by a processor to cause the processor to: provide training content to a training platform interface at a user browser, wherein the training content includes instructions for a user on interaction with an application; and provide access to an application instance at the training platform interface for user interaction with the application instance.

The computer readable storage medium may be a nontransitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the accompanying drawings.

FIG. 2 is a flow diagram of an example embodiment of a method in accordance with embodiments of the present invention;

FIG. 5 is a block diagram of an embodiment of a computer system or cloud server in which embodiments of the present invention may be implemented.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for a training platform of training a user on an application.

A closely coupled training platform hosts training content and an application being on which a user is being trained. The user is presented with the training content and the application simultaneously in a common user interface. This provides a co-presentation of the training content and the application.

The applications on which the user is being trained may use containers and the training platform may provide a session on an application instance to the user. The application instance is interacted with by a user via a user interface.

The training content may control the application instance to provide a demonstration of interaction with the application. The training content may also check and correct a user interaction with the application during the training by comparing a user's inputs with the training content. The training platform may allow the training content to suggest revision modules based on the user's inputs to the application instance.

The training platform is an improvement in the technical field of computer training generally and more particularly in the technical field of a user interaction with a computer application.

Figure 1:
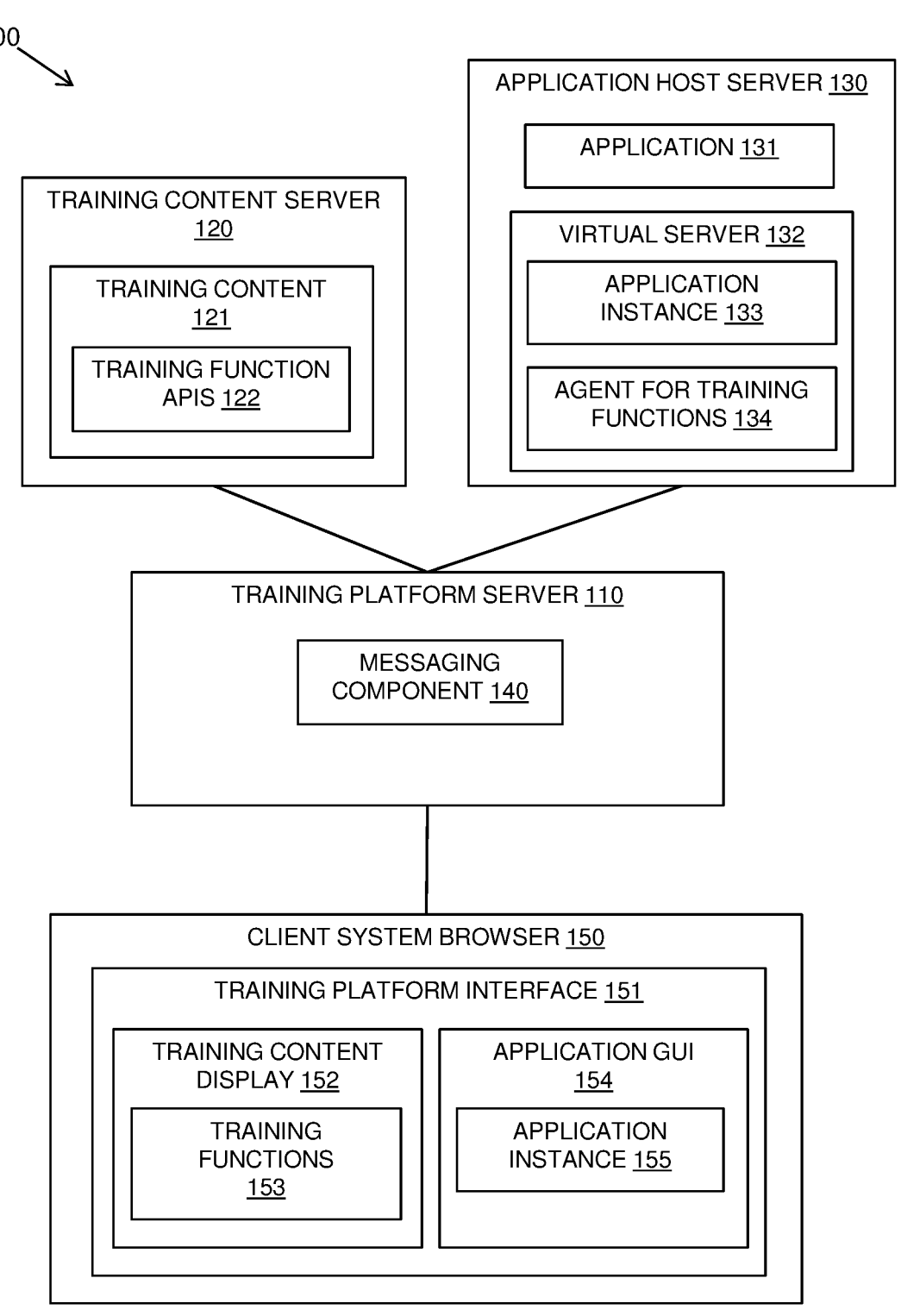
FIG. 1 is a block diagram of an example training system in accordance with embodiments of the present invention.

Referring to FIG. 1, a block diagram shows an example embodiment of a training platform system 100. A training platform server 110 is provided that presents a training platform interface 151 on a client system browser 150.

The training platform server 110 includes a messaging component 140 and provides an integrated platform between a training content server 120 and application host servers 130 providing training for applications 131 on a client system browser 150.

The training platform server 110 interacts with the training content server 120 to provide training content 121 to the client system browser 150. The training content 121 may include training function application programming interfaces (APIs) 122 that may be selected by the user for training interactions.

The training platform server 110 also interacts with one or more application host server(s) 130 that host applications 131 on which the training content 121 provides training. When the training platform server 110 provides training via a client system browser 150, a session may be provided with an application instance 133 that runs on one of multiple virtual servers 132 of an application host server 130. An agent for training functions 134 may be provided for interaction with the application instance 133 to run scripts provided by the training function APIs 122 on the application instance 133 for functions of the training content 121. The scripts originate from the training content 121 and may be sent to the virtual server 132 via the messaging component 140 on demand.

A training platform interface 151 at the client system browser 150 displays training content 152 and allows user input via an application graphical user interface (GUI) 154 to the application instance 155 of the application to which the training content 152 relates. The training platform interface 151 may also display the training functions 153 as run on the application instance 155 by the training function APIs 122.

The training function APIs 122 of the training content server 120 may provide various functions of interaction between the training content 121 and the application instance 133. The training function APIs 122 provide scripts on demand to an agent 134 running on a virtual server 132 providing the application instance 133. The demand may be in response to a user input at the training platform interface 151 for selection of a training function 153. One of the training functions may allow the training content 121 to control the application instance 133 to provide a demonstration of interaction with the application. Another training function may be for the training content 121 to check and correct a user interaction with the application instance during the training by comparing a user's inputs with the training content 121. A further function may allow the training content 121 to suggest revision modules based on the user's inputs to the application instance 133.

In one embodiment, applications may be built into containers that may be operating system independent. Containerized applications ensure scalability and applications are presented based on availability.

In another embodiment, an application may use an operating system desktop platform and may be delivered by a remote desktop connection to the client system browser. The operating system desktop may be presented with the display server combining this into the same application GUI as an application delivered via a container. The display server may translate the desktop protocols into a web based desktop so any system that uses these may be interfaced.

The training platform interface 151 may be constant regardless of the underlying operating system.

Referring to FIG. 2, a flow diagram 200 shows an example embodiment of the described method of providing a training platform for training a user on an application.

The method provides 201 training content to a training platform interface at a user browser, wherein the training content includes including instructions for a user on interaction with an application. The method provides 202 access to an application instance at the training platform interface for user interaction with the application instance. This provides an integrated training platform interface for co-presenting the training content and the application instance such that the user can interact with the application instance whilst receiving the training content.

The method may provide 203 one or more training content interaction functions for automated interaction of the training content with the application instance. This may include providing one or more interaction function application programming interfaces for running scripts on the application instance to carry out the training interaction functions. One of the training content interaction functions may be for demonstration of an interaction with the application instance to the user. Another training interaction function may be for checking a user interaction with the application instance and providing feedback to the user. wherein the feedback includes suggesting revision modules of the training content.

The method may determine 204 a training content and an application from user input received at the user browser and broadcasting a message to find a free application instance of the application. The method may select an application instance from one or more responses from application nodes based on various defined selection factors. The selection factors may include, for example, host workloads and/or host proximity to a user system. The application may be a containerized application and the method may provide 205 a session of an application instance hosted by an application node.

The method may receive 206 a user input of a selected training content interaction function. The method may activate 207 an agent at the application host to run a script on the application instance for the training content interaction function. The script may be embedded within the training content and then sent to the node as needed allowing the training content to be self-contained and the application instances to be independent of the training content.

The method may hide 208 the training content in the training platform interface during the training interaction function with the application instance.

Figure 3A:
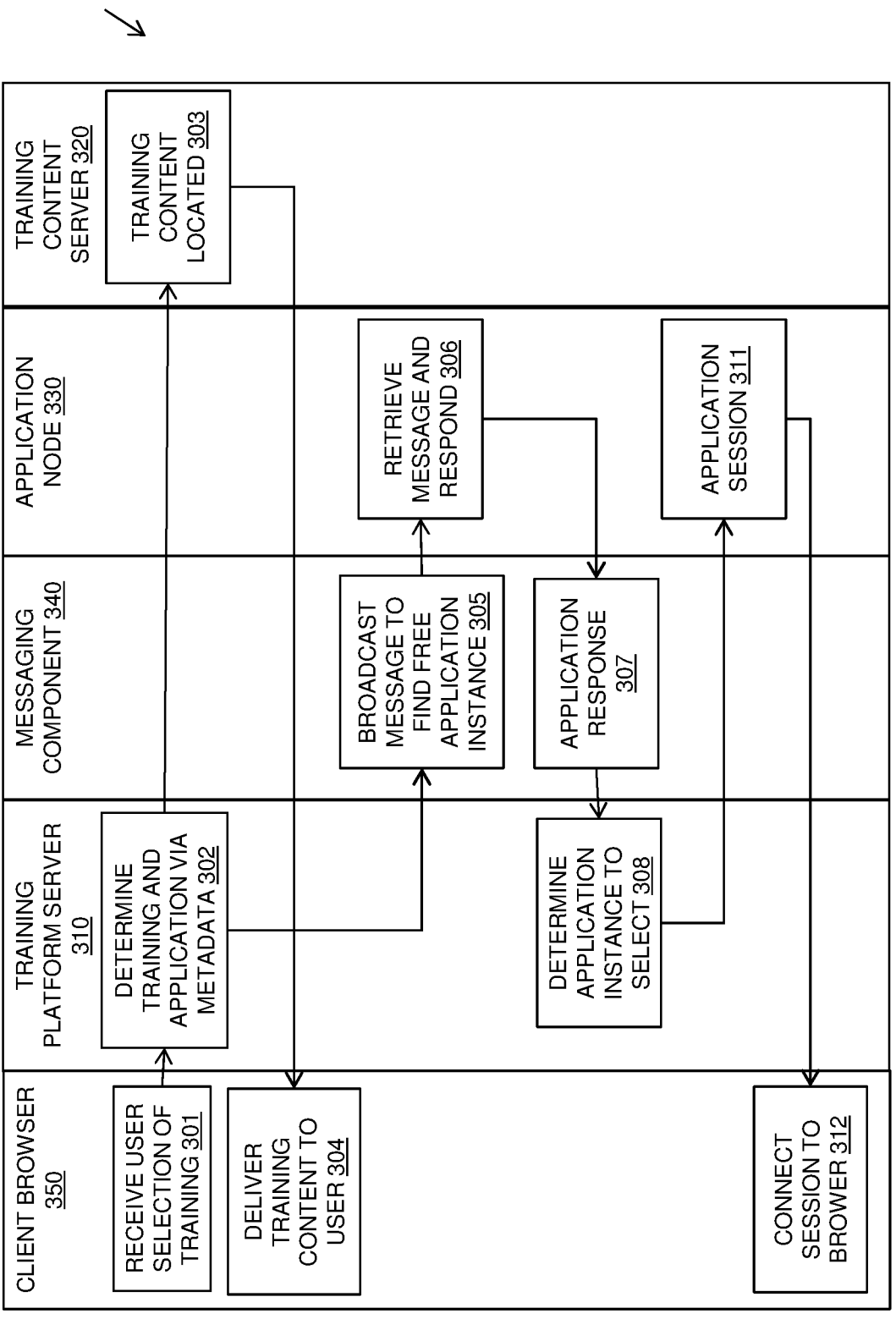
FIG. 3A is a flow diagram of an example embodiment of an aspect of a method in accordance with embodiments of the present invention.

FIG. 3A shows an example embodiment of a method of providing training content and an application instance in an integrated training. The method is illustrated as a flow diagram 300 carried out across the components in a training platform system. The components include a client browser 350, a training platform server 310, a messaging component 340, an application node 330 for providing an application instance, and a training content server 320.

A user may interact with the client browser 350 to input a selection of training content for training on an application. The client browser 350 may receive 301 the user selection of training and this may be received at the training platform server 310 that determines 302 the training content and the application via metadata. The training content is located 303 at the training content server 320 and the training content is delivered 304 from the training content server 320 to the client browser 350.

The training platform server 310 on determining 302 the training content and the application via metadata, uses the messaging component 340 to broadcast 305 a message to find a free application instance of the application. The broadcast message is sent to all application hosts.

An application node 330 retrieves the message and responds 306. Hosts able to provide the application requested with the desired configuration respond 306. The messaging component 340 receives the application responses 307, possibly multiple responses or no responses if all the hosts are busy.

The training platform server 310 determines the application instance to select 308. The training platform server 310 selects a host from the responses based on current host workload. Other factors such as proximity to the user may also be incorporated. The training platform server 310 sends a message to the selected application node 330 to establish the session. The virtual server of the application node 330 responds to the training platform server 310 accepting the session. The training platform server 310 redirects the user's browser 350 to connect 312 to the newly created application session 311.

The user may progress through the training content and may complete the course content and may close the browser window session. The training platform server 310 may send a message to the host virtual server 332 to terminate the session. The host terminates the application and the desktop session hosting it.

The training content may feature three types of interaction with the application. The interaction types may be activated by selection buttons on the client system browser training platform interface.

A first interaction may allow the user to interact with the application instance. For example, a "Try it" button may be selected. The training content may be hidden to allow the learner to use the application interactively. The training content may remain dormant until the user restores it to view.

A second interaction may allow the training content to demonstrate an interaction with the application. For example, a "Show me" button may be selected. This may start a set of automation instructions from the training content to control the application and demonstrate to the user in real time on the real application instance the lesson being taught.

In the second interaction, the training content may be hidden or minimized in the display, for example, it may be slid out of view. A message containing an automation script to run may be sent to an agent on the application host instance. The application host instance runs the automation script and, on completion, may send a message back to the training content. The training content may take a preset action on completion of the demonstration, for example, bringing the training content back into view.

Figure 3B:
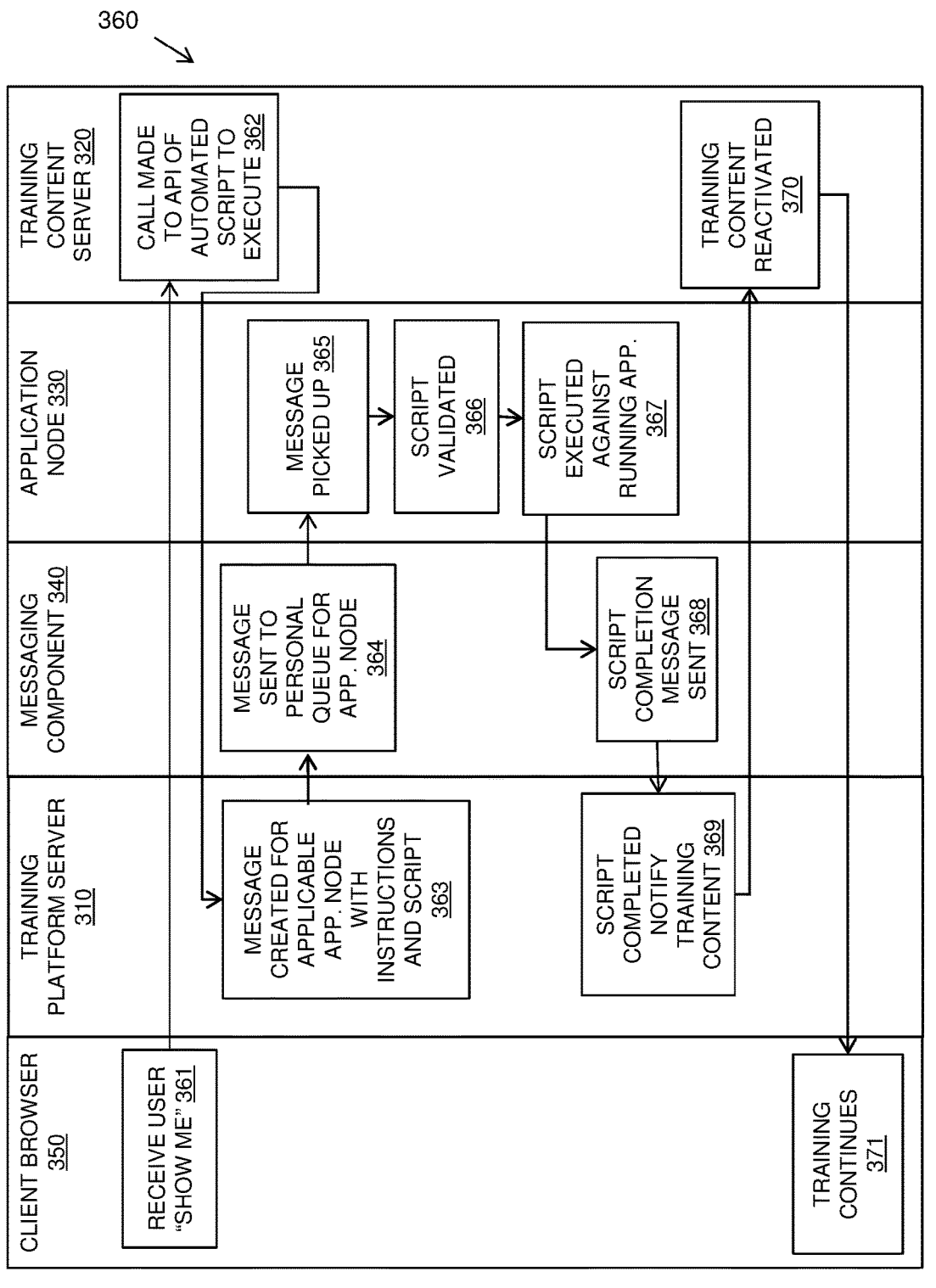
FIG. 3B is a flow diagram of an example embodiment of another aspect of a method in accordance with embodiments of the present invention.

Referring to FIG. 3B, an example embodiment is shown of a method 360 of providing a training content function demonstrating an interaction with the application. The method is illustrated as carried out across the components in a training platform system. The components include a client browser 350, a training platform server 310, a messaging component 340, an application node 330 for providing an application instance, and a training content server 320.

The client browser 350 may receive 361 a "Show me" input from the user, which may instigate 362 a call to the API of an automated script at the training content server 320. The training platform server 310 may create 363 a message for the applicable application node with instructions and script. The message is sent 364 by the messaging component 340 to a personal queue for the application node 330. The application node 330 may pick up the message 365, validate 366 the script, and execute 367 the script against the running application instance. On completion of the script, a script completion message may be sent 368 via the messaging component 340 to the training platform server 310 that notifies 369 the training content server 320 of the completion. The training content server 320 may reactivate 370 the training content and the training may continue 371 via the client browser 350.

A third interaction may allow the training content to check a user interaction with the application interface. For example, a "Check it" button may be selected. This may start an automation to read the application state and user input and match these with the expected data. This may then allow the user to either progress to the next module, make the user correct their errors, take the user back to an earlier module to revise the topic further, or offer optional suggestions of further revision or learning.

In the third interaction, the training content may be hidden or minimized in the display, for example, it may be slid out of view. A message containing an automation script to read and record any desired aspect of the application state may be sent to an agent on the application host. The application host agent may execute the script and send a response message back to the training content with the state information requested.

The training content may evaluate the response to determine if it matches the expected application state. If there is a match, then the training may proceed. If there is a minor mismatch, the training may display a correction, for example, "You should have entered 100 not 1000 in box Y". If there is a major mismatch, the training may suggest or force the user back to previous module(s) to revise the relevant training.

The response and/or reaction of the training content may be configurable for an application instance. In this way additional options may be available if needed or some of the example options above may be omitted.

Figure 4:
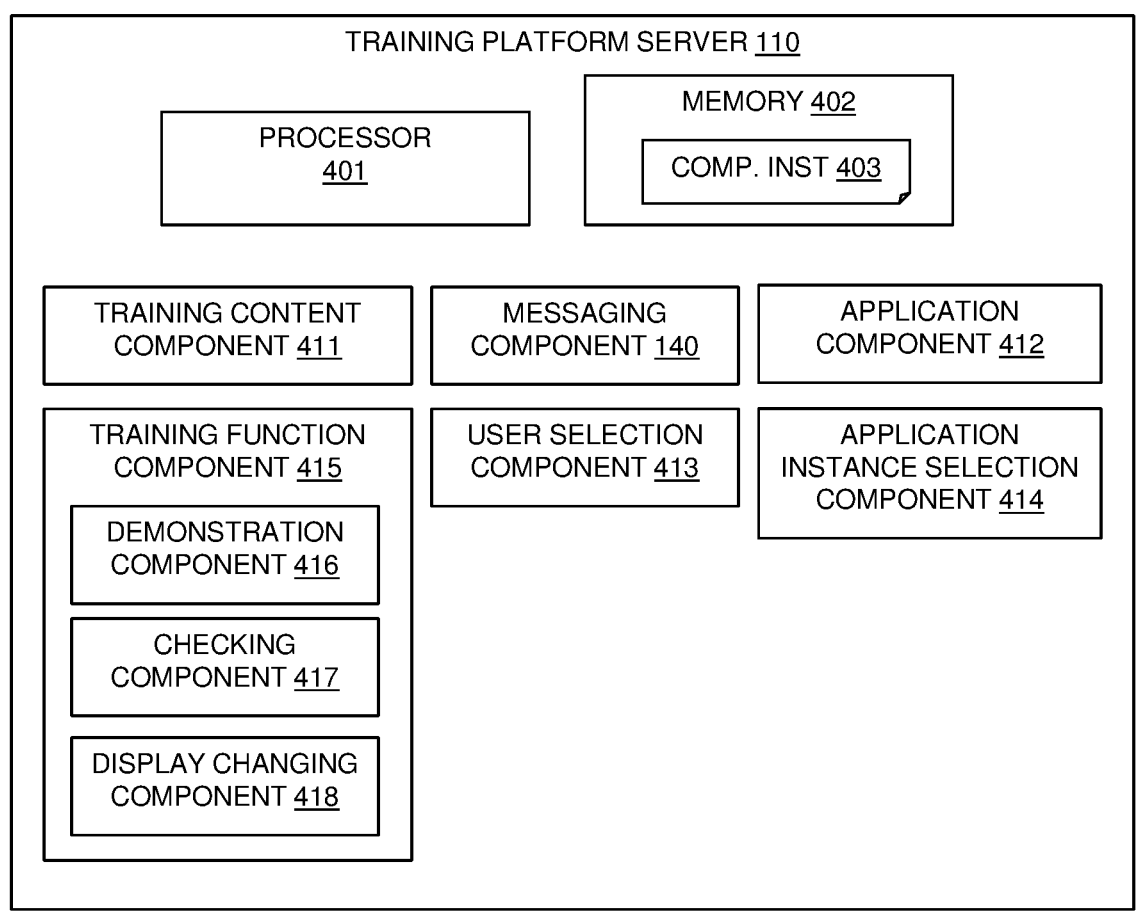
FIG. 4 is block diagram of an example embodiment of a system in accordance with embodiments of the present invention.

FIG. 4 shows a block diagram of an example embodiment of a training platform server 110 including at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The training platform server 110 includes a training content component 411 for providing training content from a training content server to a training platform interface at a user browser. The training content includes instructions for a user on interaction with an application.

The training platform server 110 includes an application component 412 for providing access to an application instance at the training platform interface for user interaction with the application instance.

The application may be a containerized application and the system may include an application node hosting a session of an application instance for an application host server.

The training platform server 110 includes a user selection component 413 for determining a training content and an application from user input received at the user browser. The training platform server 110 includes a messaging component 140 for broadcasting a message to find a free application instance of the application and for providing messaging between the training platform server 110 and the training content and the application.

The training platform server 110 includes an application instance selection component 414 for selecting an application instance from one or more responses from application nodes based on host workloads and/or host proximity to a user system.

The training platform server 110 includes a training function component 415 for providing one or more training content interaction functions for automated interaction of the training content with the application instance. The training function component 415 may activate an agent at an application node of the application instance for running scripts on the application instance to carry out the training interaction functions. The training function component 415 may include a training demonstration component 416 for demonstration of an interaction with the application instance to the user. The training function component may include a checking component 417 for checking a user interaction with the application instance and providing feedback to the user. The training function component 415 may include a display changing component 418 for hiding the training content in the training platform interface during the training interaction function with the application instance.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 5 is a block diagram of an embodiment of a computer system or cloud server in which embodiments of the present invention may be implemented.

Referring to FIG. 5, computing environment 1100 contains an example of an environment for the execution of at least some of the computer code involved in performing the inventive methods, such as for training a user on an application 1200. In addition to block 1200, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 5. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

What is claimed is:

1. A computer-implemented method for providing a training platform for training a user on an application, said method carried out by one or more processors of a computer system and comprising:

providing training content to an integrated training platform interface at a user browser, wherein the training content includes instructions for a user on interaction with an application instance;

providing access to the application instance at the integrated training platform interface for user interaction with the application instance whilst receiving the training content, wherein providing access to the application instance comprises:

broadcasting, via a messaging component, a request to identify an available application node hosting the application;

selecting, from one or more responding application nodes, an application instance based on at least one selection factor including host workload or proximity; and establishing a session between the user browser and the selected application instance for a duration of a training session;

allowing the training content to check a user interaction with the application instance and offer optional suggestions of further revision or learning;

providing one or more training content interaction functions for automated interaction of the training content with the application instance; and providing one or more interaction function application programming interfaces (APIs) for the training content for running scripts that are sent on demand to run on the application instance to carry out the training interaction functions.

2. The computer-implemented method of claim 1, including providing a session of the application instance hosted by an application node for the duration of a training session.

3. The computer-implemented method of claim 1, including:

determining the training content and the application from user input received at the user browser and broadcasting a message to find a free application instance of the application.

4. The computer-implemented method of claim 3, including:

selecting the application instance from one or more responses from application nodes based on defined selection factors.

5. The computer-implemented method as claimed in claim 1, including a training interaction function for demonstration of an interaction with the application instance to the user.

6. The computer-implemented method as claimed in claim 1, including a training interaction function for checking a user interaction with the application instance and providing feedback to the user.

7. The computer-implemented method as claimed in claim 6, wherein the feedback includes suggesting revision modules of the training content.

8. The computer-implemented method as claimed in claim 1, including hiding the training content in the training platform interface during the training interaction function with the application instance.

9. A system for providing a training platform for training a user on an application, comprising:

a processor and a memory configured to provide computer program instructions to the processor to execute a method, comprising:

providing training content from a training content server to an integrated training platform interface at a user browser, wherein the training content includes instructions for a user on interaction with an application instance;

providing access to the application instance at the integrated training platform interface for user interaction with the application instance whilst receiving the training content, wherein providing access to the application instance comprises:

broadcasting, via a messaging component, a request to identify an available application node hosting the application;

selecting, from one or more responding application nodes, an application instance based on at least one selection factor including host workload or proximity; and establishing a session between the user browser and the selected application instance for a duration of a training session;

allowing the training content to check a user interaction with the application instance and offer optional suggestions of further revision or learning;

providing one or more training content interaction functions for automated interaction of the training content with the application instance; and providing one or more interaction function application programming interfaces (APIs) for the training content for running scripts that are sent on demand to run on the application instance to carry out the training interaction functions.

10. The system of claim 9, including an application node hosting a session of an application instance for an application host server for the duration of a training session.

11. The system of claim 9, further comprising:

a user selection component for determining a training content and an application from user input received at the user browser; and a messaging component for broadcasting a message to find a free application instance of the application.

12. The system of claim 11, further comprising:

an application instance selection component for selecting an application instance from one or more responses from application nodes based on defined selection factors.

13. The system as claimed in claim 9, further comprising a training demonstration component for demonstration of an interaction with the application instance to the user.

14. The system as claimed in claim 9, further comprising a checking component for checking a user interaction with the application instance and providing feedback to the user.

15. The system as claimed in claim 9, further comprising a display changing component for hiding the training content in the integrated training platform interface during the interaction with the application instance.

16. A computer program product for providing a training platform for training a user on an application, the computer program product comprising a computer readable storage medium having program instructions embodied therewith, the program instructions executable by a processor to cause the processor to:

provide training content to a training platform interface at a user browser, wherein the training content includes instructions for a user on interaction with an application; and provide access to an application instance at the training platform interface for user interaction with the application instance, wherein providing access to the application instance comprises:

broadcasting, via a messaging component, a request to identify an available application node hosting the application;

selecting, from one or more responding application nodes, an application instance based on at least one selection factor including host workload or proximity; and establishing a session between the user browser and the selected application instance for a duration of a training session.

* * * * *